(12) United States Patent
Darby (10) Patent No.: US 10,436,383 B1
(45) Date of Patent: *Oct. 8, 2019

(54) SUPPORTING AN OBJECT AT A WINDOW OF A BUILDING USING AN ADJUSTABLE SUPPORT APPARATUS

(71) Applicant: Nation Wide Products LLC, Abilene, TX (US)

(72) Inventor: Jason Darby, Abilene, TX (US)

(73) Assignee: Nation Wide Products, Inc., Abilene, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/908,439

(22) Filed: Feb. 28, 2018

Related U.S. Application Data (63) Continuation of application No. 14/226,448, filed on Mar. 26, 2014, now Pat. No. 9,909,712, which is a continuation-in-part of application No. 13/958,453, filed on Aug. 2, 2013, now Pat. No. 9,179,794.

(51) Int. Cl.
| | |
|---|---|
| *F24F 13/32* | (2006.01) |
| *F16M 13/02* | (2006.01) |
| *A01K 1/035* | (2006.01) |
| *A47L 3/02* | (2006.01) |
| *E04G 5/00* | (2006.01) |
| *F16M 11/00* | (2006.01) |
| *E04G 23/00* | (2006.01) |

(52) U.S. Cl.
CPC ......... *F16M 13/022* (2013.01); *A01K 1/0353* (2013.01); *A47L 3/02* (2013.01); *F24F 13/32* (2013.01); *E04G 5/00* (2013.01); *E04G 23/00* (2013.01); *F16M 11/00* (2013.01); *F16M 13/02* (2013.01)

(58) Field of Classification Search
CPC ...... F16M 13/022; F16M 11/00; F16M 13/02; A01K 1/0353; A47L 3/02; F24F 13/32; F24F 13/022; F24F 1/027; F24F 2221/20; E04G 5/00; E04G 23/00
USPC .... 248/208, 236, 674, 678, 302, 298.1, 301, 248/676, 175, 220.21, 226.11, 209
See application file for complete search history.

(56) References Cited

U.S. PATENT DOCUMENTS

| | | | |
|---|---|---|---|
| 399,491 A | 3/1889 | Bukawietis | |
| 430,971 A | 6/1890 | Reed | |
| 596,427 A | * | 12/1897 | Richey .................... E06C 7/182 |
| | | | 182/106 |
| 798,683 A | 9/1905 | Ketteman | |

(Continued)

*Primary Examiner* — Nkeisha Smith
(74) *Attorney, Agent, or Firm* — Norton Rose Fulbright US LLP (57) ABSTRACT

An apparatus for supporting an object at a window of a building comprises a first member, a second member, and a third member. The first member extends along at least a partial width of the window and abuts an interior surface of the building. The first member is configured to support the object by exerting an outward force on the interior surface of the building in response to a downward force exerted by the object. The first member also comprises at least two sections extending from the interior of the building to the exterior of the building. These sections may extend from the interior of the building to the exterior of the building about respective distal ends of the first member. The sum of the forces applied on the surfaces of the building are sufficient to secure the object to the building.

10 Claims, 6 Drawing Sheets

(56) References Cited

U.S. PATENT DOCUMENTS

| | | | | |
|---|---|---|---|---|
| 800,585 | A | 9/1905 | Maxam | |
| 844,148 | A * | 2/1907 | Leger | A47L 3/02 182/60 |
| 999,897 | A | 8/1911 | Smith | |
| 1,209,839 | A | 12/1916 | Hokenson | |
| 1,261,513 | A | 4/1918 | Green | |
| 1,512,792 | A * | 10/1924 | Nelson | A47L 3/02 182/113 |
| 1,531,159 | A * | 3/1925 | Timmons | A47L 3/02 248/236 |
| 1,558,977 | A | 10/1925 | Gray | |
| 1,614,719 | A | 1/1927 | Dabney | |
| 1,627,241 | A * | 5/1927 | Johnson | A47B 5/04 182/58 |
| 1,658,942 | A | 2/1928 | Renstrom | |
| 1,663,279 | A * | 3/1928 | Portt | A47L 3/02 182/62 |
| 1,733,485 | A * | 10/1929 | Desrosiers | D06F 57/12 211/94.03 |
| 1,955,223 | A | 4/1934 | Brouyette | |
| 1,957,184 | A | 5/1934 | Smith | |
| 2,049,353 | A * | 7/1936 | Cary | A47L 3/02 182/113 |
| 2,059,115 | A | 10/1936 | Kay | |
| 2,116,427 | A | 5/1938 | Duncan | |
| 2,230,511 | A * | 2/1941 | Luttrup | A47B 21/00 248/146 |
| 2,291,430 | A * | 7/1942 | Ingersoll | H01B 17/145 16/2.2 |
| 2,381,810 | A | 8/1945 | Eldwood | |
| 2,444,746 | A | 7/1948 | Newbold | |
| 2,464,666 | A | 3/1949 | Bishop | |
| 2,568,968 | A | 9/1951 | Malcolm | |
| 2,717,139 | A | 9/1955 | Jewell | |
| 2,758,456 | A | 8/1956 | Wheeler | |
| 2,891,754 | A | 6/1959 | Kuhlenschmidt et al. | |
| 2,880,952 | A | 8/1959 | Moore et al. | |
| 2,935,284 | A | 5/1960 | Reeves | |
| 3,010,534 | A * | 11/1961 | Borke | E04G 3/18 182/58 |
| 3,273,843 | A | 9/1966 | Bell, Jr. | |
| 3,415,481 | A | 12/1968 | Greenfield | |
| 3,433,443 | A | 3/1969 | Mangan et al. | |
| 3,833,196 | A | 9/1974 | Protzman | |
| 3,857,365 | A | 12/1974 | Mueller | |
| 4,445,459 | A | 5/1984 | Julie | |
| 4,613,104 | A | 9/1986 | Garrott | |
| D288,570 | S | 3/1987 | Fonceca | |
| 4,869,451 | A | 9/1989 | Gordon | |
| 5,112,015 | A * | 5/1992 | Williams | F16M 13/022 248/228.3 |
| 5,308,037 | A * | 5/1994 | Gonzalez | F24F 13/32 248/670 |
| 5,337,697 | A | 8/1994 | Trimarchi et al. | |
| 5,347,787 | A | 9/1994 | Gavin | |
| 5,407,171 | A * | 4/1995 | Gonzalez | F16M 5/00 248/670 |
| 5,613,406 | A * | 3/1997 | Rutkowski | F16C 1/105 248/27.3 |
| 5,636,816 | A | 6/1997 | Burton et al. | |
| 5,738,319 | A | 4/1998 | Grassi | |
| 5,871,199 | A * | 2/1999 | Koike | F16F 1/3732 248/615 |
| 6,024,338 | A * | 2/2000 | Koike | F16F 1/3732 248/615 |
| 6,052,918 | A | 4/2000 | Oletzke | |
| 7,237,687 | B1 | 7/2007 | Abdi et al. | |
| 7,572,073 | B2 | 8/2009 | Kenoyer et al. | |
| 7,735,800 | B2 | 6/2010 | Lunato et al. | |
| 7,874,529 | B2 | 1/2011 | Klemm et al. | |
| 7,967,360 | B2 | 6/2011 | Holden et al. | |
| 8,091,844 | B1 | 1/2012 | Bragg | |
| 8,167,260 | B2 * | 5/2012 | Boccia | F24F 13/32 248/208 |
| 8,533,955 | B2 | 9/2013 | Agnihotri | |
| 8,584,998 | B1 | 11/2013 | Peterson | |
| 9,163,854 | B2 * | 10/2015 | Arbucci | E06B 7/28 |
| 9,447,916 | B2 * | 9/2016 | Darby | F16M 13/022 |
| D799,309 | S * | 10/2017 | Darby | D8/373 |
| 9,909,712 | B1 * | 3/2018 | Darby | F16M 13/022 |
| 2005/0224433 | A1 | 10/2005 | Heneveld, Sr. | |
| 2008/0185353 | A1 | 8/2008 | Immerman et al. | |
| 2011/0056765 | A1 | 3/2011 | Enriquez | |
| 2012/0137499 | A1 | 6/2012 | Agnihotri | |
| 2013/0228536 | A1 * | 9/2013 | Crowley | A47B 43/003 211/26 |

\* cited by examiner

SUPPORTING AN OBJECT AT A WINDOW OF A BUILDING USING AN ADJUSTABLE SUPPORT APPARATUS

CROSS-REFERENCE TO RELATED APPLICATIONS

The present application is a continuation of U.S. patent application Ser. No. 14/226,448 entitled "SUPPORTING AN OBJECT AT A WINDOW OF A BUILDING BY APPLYING OPPOSING FORCES TO AN INTERIOR SURFACE AND AN EXTERIOR SURFACE OF THE BUILDING WITH A FIRST MEMBER AND SECOND MEMBER JOINED ABOUT THEIR INTERMEDIATE SECTIONS," filed Mar. 26, 2014, and now issued as U.S. Pat. No. 9,909,712; which is a continuation-in-part of U.S. application Ser. No. 13/958,453 entitled "SUPPORTING AN OBJECT AT A WINDOW OF A BUILDING BY APPLYING OPPOSING FORCES TO AN INTERIOR SURFACE AND AN EXTERIOR SURFACE OF THE BUILDING," filed Aug. 2, 2013, and issued on Nov. 10, 2015, as U.S. Pat. No. 9,179,794, the disclosure of which is hereby incorporated herein by reference in its entirety.

BACKGROUND

Objects such as air conditioning units, plants, animal food and housing, decorative arrangements, and the like, are often secured adjacent to or partially within building windows, where a portion of those objects are located outside of the building. Since a portion of the object is located beyond the exterior of a building, there exists a potential for an object to fall from the window to the surface below. Of course, this is particularly problematic in urban areas, where several of such objects may be found in a single building, several stories above the ground surface.

As a result, strict safety regulations have been developed in some urban areas with regard to the installation and maintenance of, e.g., window air conditioning units. For example, the New York City Building Code sets forth specific guidelines that must be adhered to when such a unit is installed. Further, to date, air conditioners and other objects have been attached to a building utilizing support structures that are built into the building itself. As such, if the support system falters or is removed, the building is permanently altered or damaged. Therefore, a need exists for an object support apparatus that provides sufficient safety and does not damage or otherwise modify the building to which is secured.

BRIEF DESCRIPTION OF THE DRAWINGS

For a more complete understanding of the present invention, reference is now made to the following description taken in conjunction with the accompanying drawings, in which:

FIGS. 3F and 3F-1 are another view of an additional embodiment of an apparatus for supporting an object at a window of a building according to the inventive concepts described herein;

FIGS. 3I and 3I-1 are another view of an additional embodiment of an apparatus for supporting an object at a window of a building according to the inventive concepts described herein;

DETAILED DESCRIPTION

Embodiments described herein provide systems, apparatuses, and methods for supporting various objects about a window of a building while complying with municipal ordinances and other applicable safety requirements and not requiring any modification and/or damage to the building or window itself. Such objects include air conditioning units, plants, animal food and housing, decorative arrangements, and the like.

According to an embodiment, an apparatus for supporting an object at a window of a building comprises a first member, a second member, and a third member. The first member extends along at least a partial width of the window and abuts an interior surface of the building. The first member is configured to support the object by exerting an outward force on the interior surface of the building in response to a downward force exerted by the object. The first member also comprises at least two sections extending from the interior of the building to the exterior of the building. These sections may extend from the interior of the building to the exterior of the building about respective distal ends of the first member.

The second member is coupled to one of first member sections extending from the interior of the building to the exterior of the building. Also, the second member is configured to support the object by exerting an inward force on an exterior surface of the building in response to the downward force exerted by the object.

The third member is coupled to another of the first member sections extending from the interior of the building to the exterior of the building. Similar to the configuration of the second member, the third member is also configured to support the object by exerting an inward force on the exterior surface of the building in response to the downward force exerted by the object.

The sum of the outward force exerted by the first member on the interior surface of the building and the inward forces exerted by the second member and the third member on the exterior surface of the building are sufficient to oppose the downward force of the object. In other words, the sum of the outward force exerted by the first member on the interior surface of the building and the inward forces exerted by the second member and the third member on the exterior surface of the building are sufficient to support the object at the window.

Each of the first, second, and third members may be reversibly coupled to one another. That is, according to some embodiments, the first member is reversibly coupled to each of the second member and the third member. Further, in other embodiments, the second member and the third member are reversibly coupled to one another, e.g., at some location along the length of the first member. The coupling mechanism may be adjustable such that the dimensions of the apparatus may be adjusted in terms of length, width, and height, to accommodate objects of different sizes. Each member may couple to the other via, e.g., a slideable adjustment mechanism.

According to another embodiment, an apparatus for supporting an object at a window of a building comprises a first member and a second member. Each of the first member and the second member comprises an interior section extending along at least a partial width of the window and abutting an interior surface of the building. The interior sections are configured to support the object by exerting an outward force on the interior surface of the building in response to a downward force exerted by the object. The first member and second member also comprise intermediate sections that extend from the interior section at the interior of the building to the exterior of the building. Further, the first member and second member comprise exterior sections that extend from the intermediate sections and are configured to support the object by exerting an inward force on an exterior surface of the building in response to the downward force exerted by the object. The first and second members are coupled to one another at least at their respective interior sections and exterior sections.

Certain embodiments may be modular, comprising components that are of adjustable dimensions and configurations, being able to accommodate standard (albeit different) building dimensions and materials, window dimensions, and objects of various dimensions. This modularity also provides for easy packaging, assembly, and repair or flexible arrangement and use. Components of systems and apparatuses according to the inventive concepts are thought to advantageously comprise one or a combination of lightweight materials that impart sufficient strength such as, for example, steel, aluminum, or fiber-reinforced plastic, and the like. Accordingly, the entire weight of the object is supported by systems and apparatuses without modification and/or damage to the adjoining building.

Figure 1:
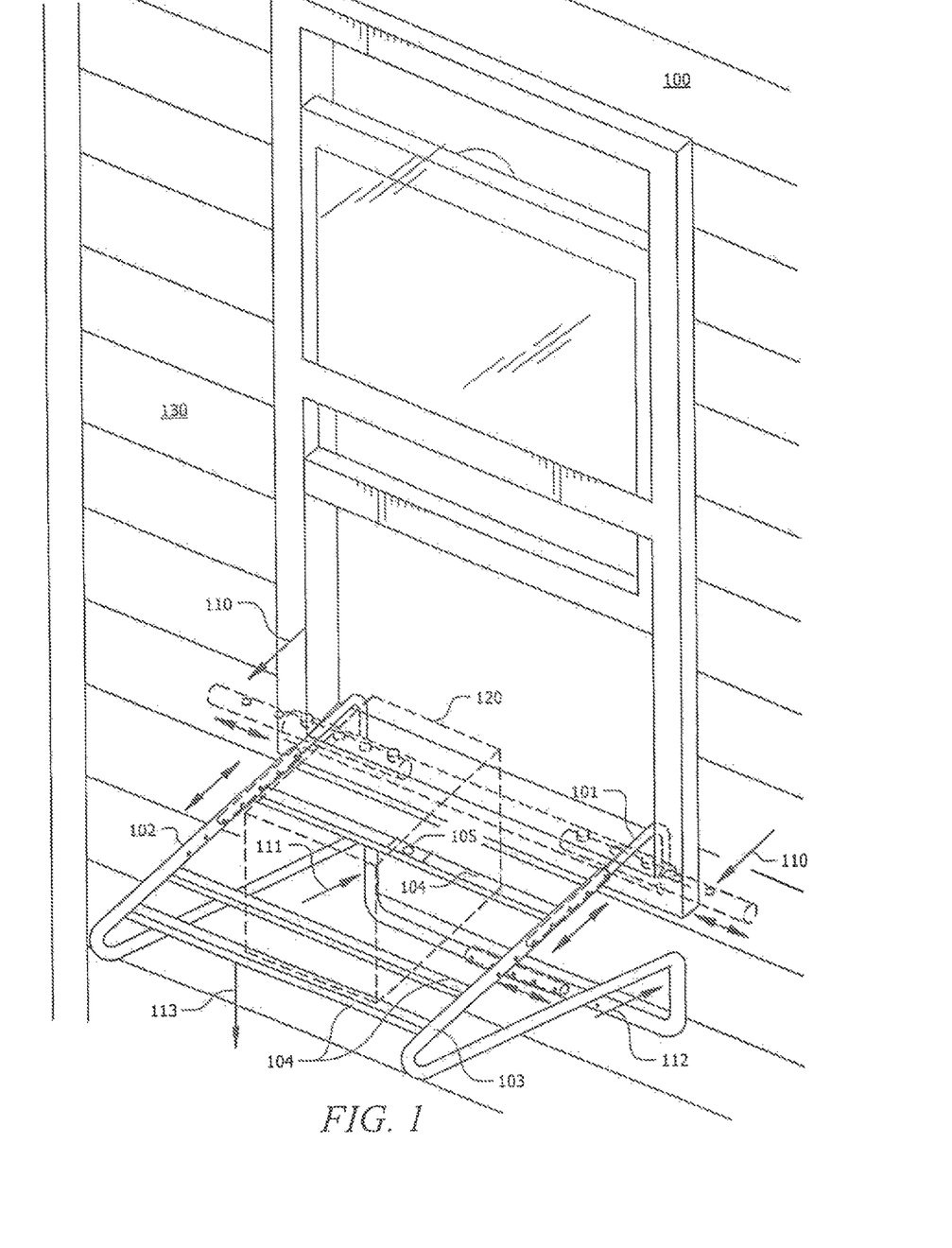
FIG. 1 illustrates an embodiment of an apparatus for supporting an object at a window of a building according to the inventive concepts described herein.

FIG. 1 illustrates an embodiment of an apparatus for supporting an object at a window of a building according to inventive concepts described herein. According to the embodiment illustrated at FIG. 1, apparatus 100 comprises first member 101, second member 102, and third member 103. First member 101 is engaged with second member 102 and third member 103 at sections of first member 101 that extend from the interior of building 130 to the exterior of building 130 at each of its respective distal ends. First member 101 is configured to apply an outward force to an interior surface of building 130 in response to a downward force exerted by object 120 being supported by apparatus 100. The outward force exerted by first member 101 is illustrated by vector 110.

Second member 102 and third member 103 are each coupled to first member 101 and are configured to apply an inward force to the exterior surface of the building 130 in response to the downward force exerted by object 120. The inward force exerted by second member 102 is illustrated by vector 111 and the inward outward force exerted by third member 103 is illustrated by vector 112. As will be described in more detail, first member 101, second member 102, and third member 103 operate to secure object 120 to building 130 without requiring any damage and/or modification to building 130 while complying with stringent municipal ordinances and other applicable safety requirements.

First member 101 is configured to extend at least along a partial width of an aperture of a building, e.g., a window, and abut an interior surface of the building on either side of the window. In some embodiments, first member 101 may extend along the entire length of the window or beyond the width. First member 101 may reversibly engage second member 102 and third member 103 by various attachment mechanisms. By way of example, first member 101 may comprise one or more notches that are configured to accept corresponding protrusions from second member 102 and third member 103 (e.g., by virtue of a male and female arrangement). In any event, first member 101 and second member 102 may form an engaged position second member 102 and third member 103 such that each is locked with respect to one another and may later be maneuvered by a user to an unengaged position, so that each may be moved or separated from one another. The reversible engagement between first member 101 with second member 102 and third member 103 (whether by a fastener, removable pins, or aligned notches and/or grooves) is advantageous because it allows the dimension of apparatus 100 to be adjusted in terms of length, width, and height to accommodate objects 120 of different sizes and each may be folded with respect to one another for packaging, transport, and the like. With each member able to be packaged while being separated from every other member, packaging and transport costs are greatly reduced.

Optionally, a sealing member configured to seal the interior of building 130 from the exterior of building 130 may be formed around the sections of first member 101 extending from the interior of building 130 to the exterior of building 130 (or second member 102 and third member 103) and the surface of a window at second member 102.

First member 101 is variable along the width of the window so that apparatus 100 may be utilized with windows of different widths. The adjustments should be sufficient to permit a width of first member 101 to be adjusted to exert sufficient outward force to the interior surface of building 130. In some embodiments, the width of first member 101 is adjusted so that first member 101 is sufficiently wider than a width of the window opening. According to one embodiment, first member 101 comprises a central portion and two telescoping distal portions, each of which may be actuated between a retracted and extended position to ensure a desired length. According to another embodiment, first member 101 may comprise two pieces, where one slides along the length of another to form a desired length. In either case, consistent with the discussion herein, the length may be fixed by a reversible fastener means, one or more securing pins or bolts, or a latch mechanism. Finally, a soft material, such as rubber or a rubber composite, may cover first member 101 to prevent damage to the interior surface and/or window surrounding.

Second member 102 and third member 103 extend from respective intermediate sections of first member 101 and support object 120 along their top surface. The length of second member 102 and third member 103 may be adjusted to accommodate different objects 120 and building walls of different thickness. According to one embodiment, second member 102 and third member 103 may comprise and outer sleeve that slides along the length of the intermediate sections of first member 101 extending from the interior of building 130. In that case, the intermediate sections of member 101 may be thought of as inner sleeves, where the length of apparatus 100 is adjusted by sliding the intermediate sections of first member 101 along the length second member 102 and third member 103. Length adjustments may be performed by aligning appropriate apertures in the inner sleeve and outer sleeve and inserting a securing pin or fastener through the aligned apertures. Length adjustments may also be performed by sliding the sleeves or segments along a series notches or grooves so that it each is seated in a desired notch or groove at the desired length.

Further, it should be appreciated that second member 102 and third member 103 (illustrated as a single component at FIG. 1) may, in fact, be configured with or comprise other structures that may be configured according to specific dimensions of object 120. For example, second member 102 and third member 103 may configured with two or more rods 104 or beams extending there between. The spacing between the multiple rods or beams 104 may be configured be a user to support the edges of object 120. Such a configuration is thought to be advantageous in that it will inhibit object 120 from becoming lopsided due to high winds, unbalanced weight, and the like.

The lower portions of second member 102 and third member 103 extend to building 130 at an angle from their top portions, i.e., where object 120 exerts a downward force illustrated by the vector 113. Accordingly, second member 102 and third member 103 structurally operate to resist the downward force exerted by object 120 that would otherwise cause object 120 to fall to the surface or rotate inward toward building 130. As such, second member 102 and third member 103 provide a supportive force, where the supportive force has at least a component perpendicular to the exterior surface of building 130, keeping object 120 separate from building 130. Further, first member 101 provides an equal, opposing supporting force perpendicular to the interior surface of building 130. In this way, first member 101, second member 102, and third member 103 restrain motion of object 120 with respect to building 130.

In one embodiment, second member 102 and 103 extend along the width of first member 101 along their lower distal ends which are reversibly coupled to one another. Second member 102 and third member 103 may be coupled along a location aligned with the medial portion of first member 101. Similar to the previous discussion, each may be adjusted by sliding along their respective length, etc. In this way, the width of apparatus 101 may be varied.

The length of second member 102 and third member 103 and the angles at which each extend toward building 130 may vary according to different considerations. For example, 1) the orthogonal or near orthogonal distance from the surface of building 130 at which second member 102 and third member 103 meets first member 101, and/or 2) the distance below first member 101 at which second member 102 and third member 103 abuts the surface of building 130 may be varied. This may be done to accommodate objects of different lengths, city ordinances, applicable safety regulations, and the like. According to one embodiment, the distance from the surface of building 130 at which second member 102 and third member 103 couple with first member 101 may be varied by sliding the end of each along a series notches or grooves so that they may be seated in a desired notch or groove. According to other embodiments, second member 102 and third member 103 can be adjusted along the length of intermediate sections of member 101 by nut and bolt combinations, screws, or a reversible fastening mechanism, such as adjustable clamping or biasing means. For example, according to one embodiment, second member 102 and third member 103 may be attached to a respective intermediate section of first member 101 by a bolt or pin inserted through a pair of aligned apertures in each (defined through either the horizontal or vertical surfaces of each).

The lower distal ends of second member 102 and third member 103 that abut building 130 may be adjustable so that they remain flush against the surface of building 130 even where the angle of second member 102 and third member 103 change with respect to the surface of building 130. In one embodiment, each comprises an adhesive material that provides sufficient resistance to alter movement. According to another embodiment, the lower end of each may be in combination with or comprise a foot such as a resilient, vibration isolation pad secured thereto, which effectively serves as a "non-skid" pad.

As seen from the previous description, object 120 is supported along building 130 by virtue of the physical arrangement between first member 101, second member 102, and third member 103, because the physical arrangement of those components provides sufficient forces against both the interior and exterior surfaces of building 130 in response to the downward force exerted by object 120. As such, no further mechanical support is needed. Instead, by virtue of this arrangement, the surfaces of building 130 are leveraged to secure object 120 thereto. That is, according to the embodiment illustrated in FIG. 1, the downward force exerted by object 120 on apparatus 100 operates to bias first member 101 toward the interior wall of building 130. In doing so, the bias is of sufficient magnitude to hold first member 101 at a fixed position at the interior surface of building 130. Simultaneously, the downward force exerted by object 120 on apparatus 100 operates to bias second member 102 and third member 103 toward exterior surface of building 130. The bias is of sufficient magnitude to hold the lower distal ends of second member 102 and third member 103 at a fixed position at the exterior surface of building 130.

Apparatus 100 may further comprise level indicator 105, which includes a bubble floating in a liquid contained in an elongated, clear tube. The level indicator may also include a first line disposed across the tube toward the distal end thereof and a second line disposed across the tube toward the proximal end thereof. After placing object 120 in an initial position, reference may be made to level indicator 105. The angle of second member 102 and third member 103 may be adjusted as described above, until the floating bubble indicates that object 120 is at a desired angle with respect to building 130.

Figure 2:
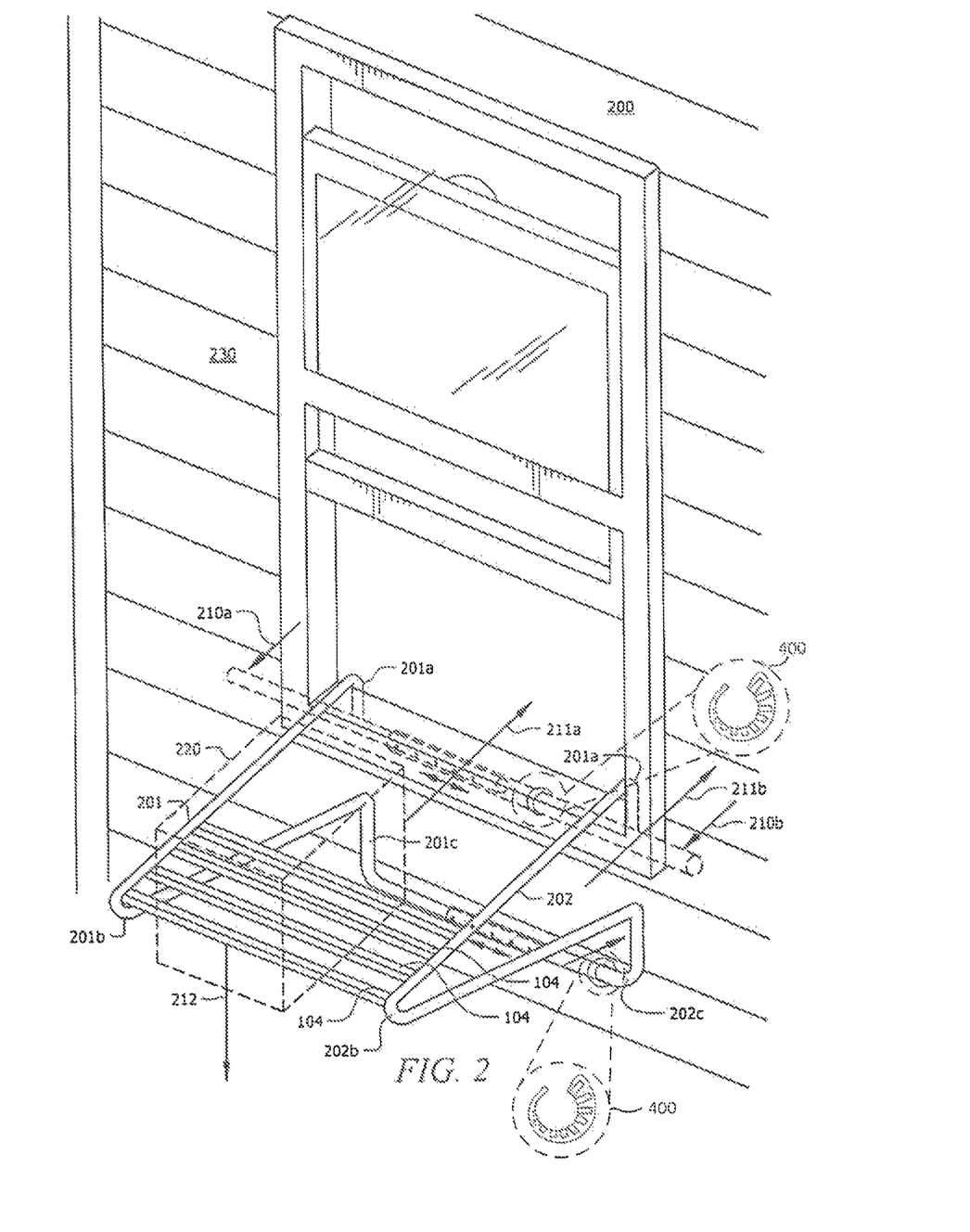
FIG. 2 illustrates another embodiment of an apparatus for supporting an object at a window of a building according to the inventive concepts described herein.

FIG. 2 illustrates another embodiment of an apparatus for supporting an object at a window of a building according to inventive concepts described herein. According to the embodiment illustrated at FIG. 2, apparatus 200 comprises first member 201 and second member 202. First member 201 comprises sections 201a, 201b, and 201c and second member 202 comprises sections 202a, 202b, and 202c.

Interior section 201a extends along at least a partial width of the window and abuts an interior surface of building 230. Interior section 201a supports object 120 by exerting an outward force on the interior surface of building 130 in response to a downward force exerted by object 220 on apparatus 200. The outward force exerted by interior section 201a is illustrated by vector 210a.

Intermediate section 201b extends from interior section 201a at the interior of building 130 to the exterior of building 230. Intermediate section 201b extends from interior section 201 at a distal end of interior section of 201a.

Exterior section 201c extends from intermediate section 201b and is configured to support object 220 by exerting an inward force on an exterior surface of building 130 in response to the downward force exerted by object 220. The inward force exerted by interior section 201c is illustrated by vector 211a.

Interior section 202a extends along at least a partial width of the window and abuts an interior surface of building 130. Interior section 202a supports object 220 by exerting an outward force on the interior surface of building 230 in response to a downward force exerted by object 220 on apparatus 200. The outward force exerted by interior section 202a is illustrated by vector 210b.

Intermediate section 202b extends from interior section 202a at the interior of building 130 to the exterior of building 230. Intermediate section 202b extends from interior section 202 at a distal end of interior section of 202a.

Exterior section 202c extends from intermediate section 202b and is configured to support object 220 by exerting an inward force on an exterior surface of building 230 in response to the downward force exerted by object 120. The inward force exerted by interior section 202c is illustrated by vector 211b.

First member 201 and second member 202 may be coupled to one another according to any number of mechanisms as discussed herein. According to a preferred embodiment, each are reversibly coupled to one another along their respective interior sections and exterior sections and slide or move with respect to one another to vary the dimensions of apparatus 200.

According to the operation of apparatus 200, the sum of the outward forces exerted by the interior sections of members 201 and 202 on the interior surface of building 230 and the inward forces exerted by the exterior sections of members 201 and 202 on the exterior surface of building 230 are sufficient to oppose the downward force of object 220. The downward force exerted by object 220 is illustrated by the vector 212. In other words, the sum of the outward forces exerted by the interior sections of members 201 and 202 on the interior surface of building 130 and the inward forces exerted by the exterior sections of members 201 and 202 on the exterior surface of building are sufficient to support object 220 at the window.

Figure 3A:
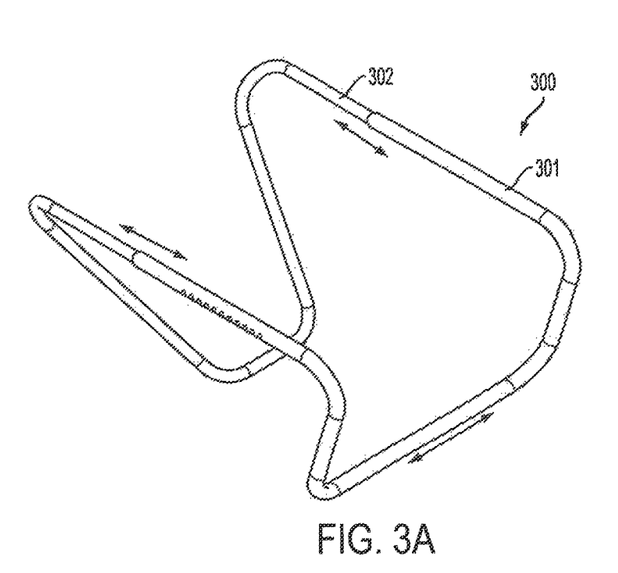
FIG. 3A illustrates an additional embodiment of an apparatus for supporting an object at a window of a building according to the inventive concepts described herein.

FIG. 3A is a perspective view of a two member apparatus 300 according to another embodiment. According to the embodiment illustrated at FIG. 3A, apparatus 300 comprises first member 301 and second member 302. First member 301 is engaged with second member 302 at sections of first member 301 that extend from the interior of a building (e.g., building 130 illustrated in FIG. 1) to the exterior of building 130.

Second member 302 is coupled to first member 301 and is configured to apply an inward force to the exterior surface of building 130 in response to the downward force exerted by object 120. First member 301 and second member 302 operate to secure an object (e.g., such as object 120 illustrated in FIG. 1) to building 130 without requiring any damage and/or modification to building 130 while complying with stringent municipal ordinances and other applicable safety requirements.

First member 301 is configured to extend at least along a partial width of an aperture of a building, e.g., a window, and abut an interior surface of the building. In some embodiments, first member 301 may extend along the length of the window or beyond the width. First member 301 may reversibly engage second member 302 by various attachment mechanisms. By way of example, first member 301 may comprise one or more notches that are configured to accept corresponding protrusions from second member 302 (e.g., by virtue of a male and female arrangement). In any event, first member 301 and second member 302 may form an engaged position such that each is locked with respect to one another and may later be maneuvered by a user to an unengaged position, so that each may be moved or separated from one another. The reversible engagement between first member 301 and second member 302 (whether by a fastener, removable pins, or aligned notches and/or grooves) is advantageous because it allows the dimension of apparatus 300 to be adjusted in terms of length, width, and height to accommodate objects 120 of different sizes and each may be folded with respect to one another for packaging, transport, and the like. With each member able to be packaged while being separated from every other member, packaging and transport costs are greatly reduced.

Optionally, a sealing member configured to seal the interior of building 130 from the exterior of building 130 may be formed around the sections of first member 301 extending from the interior of building 130 to the exterior of building 130 (or second member 302) and the surface of a window second member 302.

First member 301 is variable along the width of the window so that apparatus 300 may be utilized with windows of different widths. The adjustments should be sufficient to permit a width of first member 301 to be adjusted to stabilize object 120 or otherwise exert sufficient force to the interior surface of building 130. In some embodiments, the width of first member 301 is adjusted so that first member 301 is sufficiently wider than a width of the window opening. According to the illustrated embodiment, first member 301 comprises a central section and two distal sections that extend from the interior of the building to the exterior of the building, each of which may be actuated between a retracted and extended position to ensure a desired length. The effective length of these sections may be fixed at different lengths by a reversible fastener means, one or more securing pins or bolts, or a latch mechanism. Finally, a soft material, such as rubber or a rubber composite, may cover first member 301 to prevent damage to the interior surface and/or window surrounding.

The intermediate sections of second member 302 mate with, and extend from, corresponding intermediate sections of first member 301. The mated intermediate sections of first member 301 and second member 302 form sections of a top surface that may support an object. The lengths of these sections of second member 302 may be adjusted to accommodate different objects 120 and building walls of different thickness. According to one embodiment, the intermediate sections of second member 302 may comprise an outer sleeve that slides along the length of the intermediate sections of first member 301 extending from the interior of building 130. In that case, the intermediate sections of member 301 may be thought of as inner sleeves, where the length of apparatus 300 is adjusted by sliding the intermediate sections of first member 301 along the lengths of corresponding intermediate sections of second member 302. Length adjustments may be performed by aligning appropriate apertures in the inner sleeve and outer sleeve and inserting a securing pin or fastener through the aligned apertures. Length adjustments may also be performed by sliding the sleeves or segments along a series notches or grooves so that it each is seated in a desired notch or groove at the desired length.

Further, it should be appreciated that second member 302 may be configured with or comprise other structures that may be configured according to specific dimensions of object 120. For example, second member 302 may be configured with two or more rods (not illustrated) extending between its intermediate sections. The spacing between the multiple rods or beams may be configured be a user to support the edges of object 120. Such a configuration is thought to be advantageous in that it will inhibit object 120 from becoming lopsided due to high winds, unbalanced weight, and the like.

The lower section of second member 302 extends to building 130 at an angle from its intermediate, top-most sections, i.e., where object 120 exerts a downward force. Accordingly, second member 302 structurally operates to resist the downward force exerted by object 120 that would otherwise cause object 120 to fall to the surface or rotate inward toward building 130. As such, second member 302 provides a supportive force, where the supportive force has at least a component perpendicular to the exterior surface of building 130, keeping object 120 separate from building 130. Further, first member 301 provides an equal, opposing supporting force perpendicular to the interior surface of building 130. In this way, first member 301, second member 302, and third member 303 restrain motion of object 120 with respect to building 130.

The effective length of second member 302 and the angles at which it extends toward building 130 may vary according to different considerations. For example, 1) the orthogonal or near orthogonal distance from the surface of building 130 at which intermediate sections of second member 302 meet corresponding sections of first member 301, and/or 2) the distance below first member 301 at which second member 302 abuts the surface of building 130 may be varied. This may be done to accommodate objects of different lengths, city ordinances, applicable safety regulations, and the like. According to one embodiment, the distance from the surface of building 130 at which second member 302 couples with first member 301 may be varied by sliding the end of each intermediate section along a series of notches or grooves so that they may be seated in a desired notch or groove. According other embodiments, intermediate sections of second member 302 can be adjusted along the length of intermediate sections of member 301 by nut and bolt combinations, screws, or a reversible fastening mechanism, such as adjustable clamping or biasing means. For example, according to one embodiment, second member 302 may be attached to second member intermediate section of first member 301 by a bolt or pin inserted through a pair of aligned apertures in each (defined through either the horizontal or vertical surfaces of each).

The lower distal end of second member 302 that abuts building 130 may be adjustable so that it remains flush against the surface of building 130 even where the angle of the lower section of second member 302 changes with respect to the surface of building 130. In one embodiment, the lower section of second member 302 comprises an adhesive material that provides sufficient resistance to alter movement. According to another embodiment, the lower section of second member 302 may be in combination with or comprise a foot such as a resilient, vibration isolation pad secured thereto, which effectively serves as a "non-skid" pad.

As seen from the previous description, object 120 is supported along building 130 by virtue of the physical arrangement between first member 301 and second member 302, because the physical arrangement of those components provides sufficient forces against both the interior and exterior surfaces of building 130 in response to the downward force exerted by object 120 on second member 302. As such, no further mechanical support is needed. Instead, by virtue of this arrangement, the surfaces of building 130 are leveraged to secure object 120 thereto. That is, according to the embodiment illustrated in FIG. 3A, the downward force exerted by object 120 on apparatus 300 operates to bias first member 301 toward the interior wall of building 130. In doing so, the bias is of sufficient magnitude to hold first member 301 at a fixed position at the interior surface of building 130. Simultaneously, the downward force exerted by object 120 on apparatus 300 operates to bias second member 302 toward exterior surface of building 130.

Figure 3B:
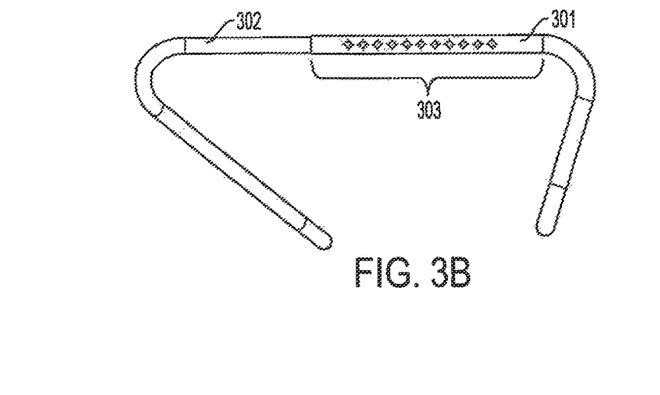
FIG. 3B is another view of an additional embodiment of an apparatus for supporting an object at a window of a building according to the inventive concepts described herein.
Figure 3C:
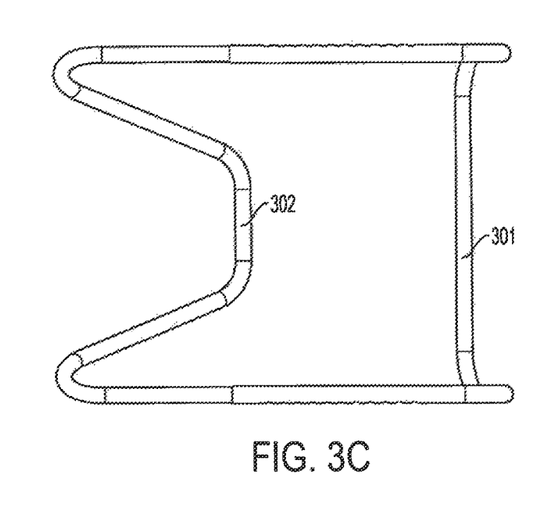
FIG. 3C is another view of an additional embodiment of an apparatus for supporting an object at a window of a building according to the inventive concepts described herein.
Figure 3D:
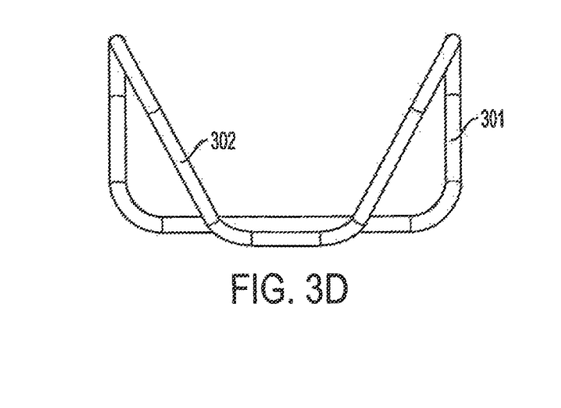
FIG. 3D is another view of an additional embodiment of an apparatus for supporting an object at a window of a building according to the inventive concepts described herein.

FIG. 3B is a side view of apparatus 300. According to the illustrated embodiment, the effective length of apparatus 300 may be varied by fixing intermediate sections of member 302 along corresponding intermediate sections of first member 301. This is done utilizing length adjustment mechanism 303, which may be a mechanism as described herein. From FIG. 3B, the effective length of apparatus 300 in the illustrated configuration is approximately 20 inches. The effective height of first member 301 in the illustrated configuration is approximately 8.5 inches, while the effective height of second member 302 in the illustrated configuration is approximately 9 inches. Along its lower segment, the distance from the outer most piece of second member 302 to the inner most piece of second member 302 in the illustrated configuration is approximately 8.43 inches. Along its lower segment, the distance from the inner most piece of first member 301 to the outer most piece of first member 301 in the illustrated configuration is approximately 2.5 inches. Consistent with the foregoing, FIG. 3C is a top view of apparatus 300 and FIG. 3D is a rear view of apparatus 300.

Figure 3E:
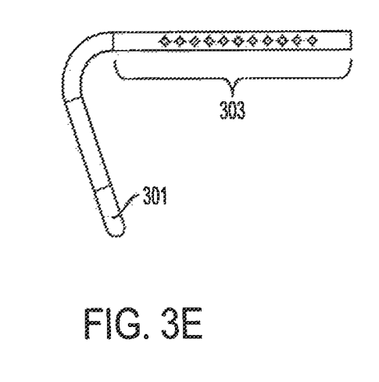
FIG. 3E is another view of an additional embodiment of an apparatus for supporting an object at a window of a building according to the inventive concepts described herein.
Figure 3F:
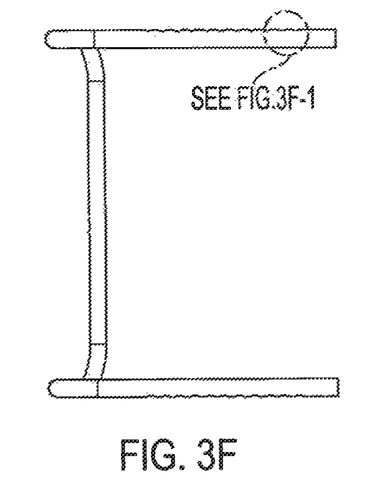
Figure 3F:
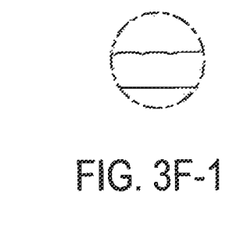
Figure 3G:
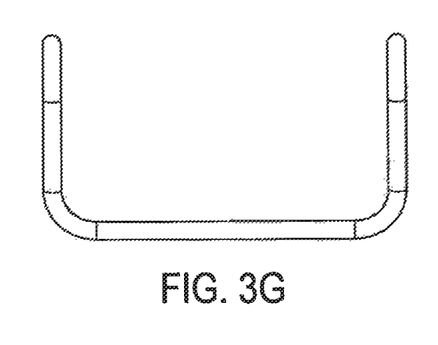
FIG. 3G is another view of an additional embodiment of an apparatus for supporting an object at a window of a building according to the inventive concepts described herein.

FIG. 3E is a side view of first member 301. Consistent with the foregoing, the effective length of apparatus 300 may be varied by fixing intermediate sections of first member 301 along corresponding intermediate sections of second member 302 (not illustrated) utilizing length adjustment mechanism 303. In the illustrated embodiment, adjustment mechanism 303 comprises 11 apertures in first member 301 having a diameter of 0.266 inches, where the apertures are placed along the outside of the tube of first member 301, but not the inside of the tube as well. The angle of the lower section of first member 301 with respect to the intermediate section of first member 301 is approximate 72.57 degrees. Exemplary lengths of each section are also illustrated. Consistent with the foregoing, FIGS. 3F and 3F-1 are top views of first member 301 and FIG. 3G is a rear view of first member 301.

Figure 3H:
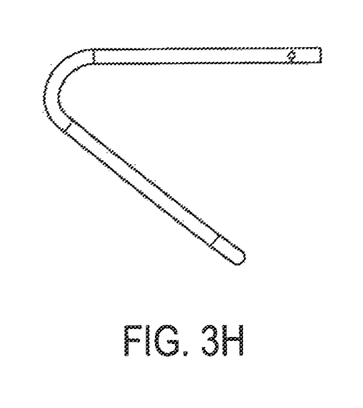
FIG. 3H is another view of an additional embodiment of an apparatus for supporting an object at a window of a building according to the inventive concepts described herein.
Figure 3I:
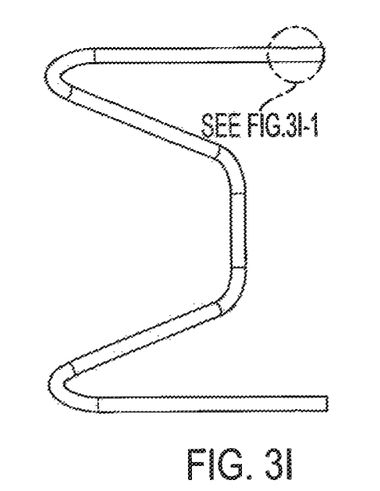
Figure 3I:
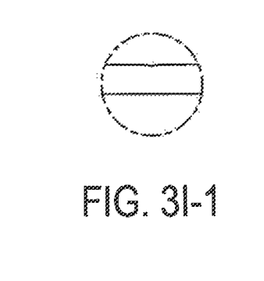
Figure 3J:
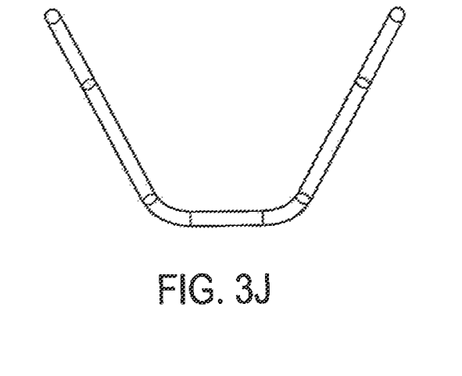
FIG. 3J is another view of an additional embodiment of an apparatus for supporting an object at a window of a building according to the inventive concepts described herein.

FIG. 3H is a side view of second member 302. Consistent with the foregoing, the effective length of apparatus 300 may be varied by fixing intermediate sections of second member 302 along corresponding intermediate sections of first member 301 (not illustrated) utilizing length adjustment mechanism 303. In the illustrated embodiment, adjustment mechanism 303 comprises an aperture in second member 302 having a diameter of 0.266 inches, where the aperture is placed along the outside of the tube of second member 302, but not the inside of the tube as well. The aperture in second member 302 may align with any of the 11 apertures in first member 301 and receive a fastening means there through. The angle of the lower section of second member 302 with respect to the intermediate section of second member 302 is approximately 37.79 degrees. Exemplary lengths of each section are also illustrated. Consistent with the foregoing, FIGS. 3I and 3I-1 are top views of second member 302 and FIG. 3J is a rear view of second member 302. As best seen from FIGS. 3I and 3J, the lower section of second member 302 tapers as it extends downward, such that its width at the lower-most section is approximately 3.07 inches, while its width at the upper-most section is approximately 14.54 inches.

Figure 4A:
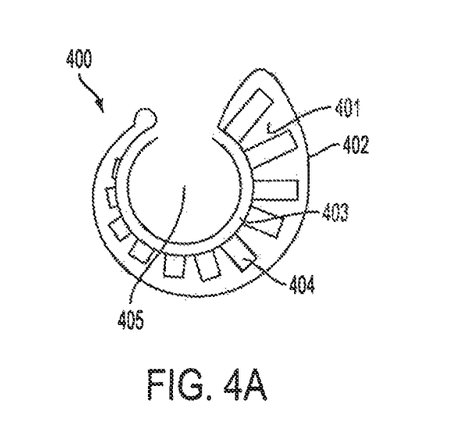
FIG. 4A is a cross section view of an embodiment of a fitting according to the inventive concepts described herein.

FIG. 4A is a cross section view of an embodiment of fitting 400 according to an aspect of the disclosure. Fitting 400 comprises an elongate tube defined by partial shell 401 having outer circumference 402 and inner circumference 403. Braces 404 extend between outer circumference 402 and inner circumference 403. Braces 404 are variable in length, such that one or more braces 400 extending between outer circumference 402 and inner circumference 403 over one radial segment of partial shell 401 (e.g., 0°-60°) are of a different length than braces 404 extending between outer circumference 402 and inner circumference 403 over another radial segment of partial shell 401 (e.g., 61°-120°).

Figure 4B:
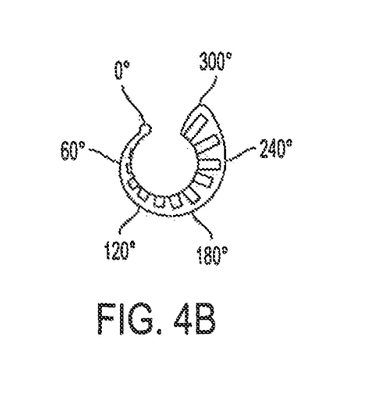
FIG. 4B is another cross section view of an embodiment of a fitting according to the inventive concepts described herein.

Referring to FIG. 4B, according to the illustrated embodiment, 0° may be defined as the point at which partial shell 401 begins and coincides with the point at which the difference between outer circumference 402 and inner circumference 403 is minimized. At 0° the length of braces 404 is minimal and the distance between outer circumference 402 and central coaxial point 405 is the same as the distance between inner circumference 403 and coaxial point 405. Moving radially along partial shell 401, the length of braces 404 increases, and as a result, the radius between outer circumference 402 and inner circumference 403 increases. As this happens, the distance between outer circumference 402 and central coaxial point 405 increases while the distance between inner circumference 403 and coaxial point 405 remains the same. At 60° the length of braces 404 has increased such that the distance between outer circumference 402 and inner circumference 403 has increased to 0.390 inches. The gradual increase in length of braces 404 continues moving radially along outer circumference 402 and inner circumference 403 such that the distance between the circumferences increases to 0.444 inches at 120°, 0.497 inches at 180°, 0.550 inches at 240°, and 0.603 inches at 3000. Using the same reference points, partial shell 401 is open between 301° and 360°.

According to a preferred embodiment, fitting 400 comprises a material that is flexible enough to snap onto a member, e.g., first member 301 or second member 302, yet strong enough to offer support. Once a member is snapped onto place, fitting 400 secures one such member within inner circumference 403. Dimensionally, fitting 400 is preferably sized to snap over 15 mm and 18 mm tubes, which correspond to a preferred size of members such as first member 301 and second member 302.

When utilized, fitting 400 operates to change the effective circumference of one or more components of an apparatus described herein. For example with respect to apparatus 300 illustrated in FIG. 3A, fitting mechanism 400 may be placed on first member 301 and/or second member 302 and change their effective circumferences.

Consider the case where apparatus 300 is placed about a window such that the lower segment of first member 301 abuts the interior wall of building 130 and the lower segment of second member 302 abuts the exterior wall of building 130. As previously described, attachment mechanism 303 may be utilized to adjust the effective length of apparatus 300 and correspondingly, the distance between the lower segment of first member 301 and the lower segment of second member 302. Doing so is intended to bias first member 301 toward the interior and bias second member 302 toward the exterior, thereby reducing play between apparatus 300 and the window.

In some cases, attachment mechanism 303 can, at best, provide incremental changes where adjustments are made at, e.g., ⅛ inch increments. Such incremental adjustments are not most desirable where the exact width of a wall of building 130 is such that the effective length of apparatus 300 cannot be set so that it fits the wall without play.

As such, there may be a need to further refine the attachment of apparatus 300 to building 130. Using mechanism 400, the effective circumference of members 301 and/or 302 may be increased to provide a secure fit where an incremental change, such as that provided by mechanism 303, cannot do so. By rotating fitting 400 about one or more members so that a portion of partial shell 401 having longer braces 404 extends between the wall and the member, the gap between the member and the wall is closed. That is, rotating fitting 400 about one or more members may increase the circumference of those members and correspondingly, decrease the gap between the members and the wall. Therefore, fitting 400 provides a mechanism to seamlessly minimize a gap existing between the wall and the member, thereby providing refined fitting adjustments that would otherwise be unavailable.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An apparatus that when installed at a window of a building supports an object at the window of the building, the apparatus comprising:
 a first member and a second member that, when the apparatus is installed at the window of the building, couple to one another at a first location and a second location, where
 the first member comprises:
 a first interior section that, when the apparatus is installed at the window of the building, abuts an interior surface of the building along a width of the window, and a first intermediate section that, when the apparatus is installed at the window of the building, extends from an interior of the building to an exterior of the building, and the second member comprises:

a second intermediate section that, when the apparatus is installed at the window of the building, extends from the first intermediate section at the first location and the second location, and a second exterior section that, when the apparatus is installed at the window of the building, extends from the second intermediate section to an exterior surface of the building and abuts the exterior surface of the building along the width of the window when installed at the window, where, when the apparatus is installed at the window of the building, an amount which the apparatus extends from the window is adjustable by sliding the first intermediate section and the second intermediate section along their length with respect to one another at the first location and the second location; and one or more fitting mechanisms that, when the apparatus is installed at the window of the building, is placed about at least a partial circumference of at least one of the first interior section or the second exterior section, where the one or more fitting mechanisms increases in length along a radial direction, and, when the apparatus is installed at the window of the building, is configured to rotate about the at least one of the first interior section or the second exterior section to reduce a gap between the at least one of the first interior section or the second exterior section and a building surface by placing a portion of a fitting mechanism of sufficient length between the at least one of the first interior section or the second exterior section and the building surface to reduce the gap.

2. The apparatus of claim 1 where a sum of an outward force exerted by the first interior section on the interior surface of the building and an inward force exerted by the second exterior section on the exterior surface of the building are sufficient to oppose a downward force of the object.

3. The apparatus of claim 1 where a sum of an outward force exerted by the first interior section on the interior surface of the building and an inward force exerted by the second exterior section on the exterior surface of the building are sufficient to support the object at the window.

4. The apparatus of claim 1 where the first member and the second member are coupled to a plurality of support structures extending there between, where the support structures are adjustable to align with the object.

5. A method for securing an object at a window of a building, the method comprising:

installing an apparatus at the window of the building, where the apparatus comprises:

a first member and a second member that, when the apparatus is installed at the window of the building, couple to one another at a first location and a second location, where the first member comprises:

a first interior section that, when the apparatus is installed at the window of the building, abuts an interior surface of the building along a width of the window, and a first intermediate section that, when the apparatus is installed at the window of the building, extends from an interior of the building to an exterior of the building, and the second member comprises:

a second intermediate section that, when the apparatus is installed at the window of the building, extends from the first intermediate section at the first location and the second location, and a second exterior section that, when the apparatus is installed at the window of the building, extends from the second intermediate section to an exterior surface of the building and abuts the exterior surface of the building along the width of the window when installed at the window, where, when the apparatus is installed at the window of the building, an amount which the apparatus extends from the window is adjustable by sliding the first intermediate section and the second intermediate section along their length with respect to one another at the first location and the second location; and one or more fitting mechanisms that, when the apparatus is installed at the window of the building, is placed about at least a partial circumference of at least one of the first interior section or the second exterior section, where the one or more fitting mechanisms increases in length along a radial direction, and, when the apparatus is installed at the window of the building, is configured to rotate about the at least one of the first interior section or the second exterior section to reduce a gap between the at least one of the first interior section or the second exterior section and a building surface by placing a portion of a fitting mechanism of sufficient length between the at least one of the first interior section or the second exterior section and the building surface to reduce the gap.

6. The method of claim 5 where a sum of an outward force exerted by the first interior section on the interior surface of the building and an inward force exerted by the second exterior section on the exterior surface of the building are sufficient to oppose a downward force of the object.

7. The method of claim 5 where a sum of an outward force exerted by the first interior section on the interior surface of the building and an inward force exerted by the second exterior section on the exterior surface of the building are sufficient to support the object at the window.

8. The method of claim 5 where the first member and the second member are coupled to a plurality of support structures extending there between, where the support structures are adjustable to align with the object.

9. An apparatus that when installed at a window of a building supports an object at the window of the building, the apparatus comprising:

a continuous first member and a continuous second member that, when the apparatus is installed at the window of the building, couple to one another at a first location and a second location, where the continuous first member comprises:

a first interior section that, when the apparatus is installed at the window of the building, abuts an interior surface of the building along a width of the window, and a first intermediate section that, when the apparatus is installed at the window of the building, extends from an interior of the building to an exterior of the building, and the continuous second member comprises:

a second intermediate section that, when the apparatus is installed at the window of the building, extends from the first intermediate section at the first location and the second location, and a second exterior section that, when the apparatus is installed at the window of the building, extends from the second intermediate section to an exterior surface of the building and abuts the exterior surface of the building along the width of the window, where an amount which the apparatus extends from the window is adjustable by sliding the first intermediate section and the second intermediate section along their length with respect to one another at the first location and the second location; and one or more fitting mechanisms that, when the apparatus is installed at the window of the building, is placed about at least a partial circumference of at least one of the first interior section or the second exterior section, where the one or more fitting mechanisms increases in length along a radial direction, and by rotating about the at least one of the first interior section or the second exterior section operates to change an effective circumference of the at least one of the first interior section or the second exterior section to reduce a gap between the at least one of the first interior section or the second exterior section and a building surface.

10. A method for securing an object at a window of a building, the method comprising:

installing an apparatus at the window of the building, where the apparatus comprises:

a continuous first member and a continuous second member that, when the apparatus is installed at the window of the building, couple to one another at a first location and a second location, where the continuous first member comprises:

a first interior section that, when the apparatus is installed at the window of the building, abuts an interior surface of the building along a width of the window, and a first intermediate section that, when the apparatus is installed at the window of the building, extends from an interior of the building to an exterior of the building, and the continuous second member comprises:

a second intermediate section that, when the apparatus is installed at the window of the building, extends from the first intermediate section at the first location and the second location, and a second exterior section that, when the apparatus is installed at the window of the building, extends from the second intermediate section to an exterior surface of the building and abuts the exterior surface of the building along the width of the window, where an amount which the apparatus extends from the window is adjustable by sliding the first intermediate section and the second intermediate section along their length with respect to one another at the first location and the second location; and installing one or more fitting mechanisms that, when the apparatus is installed at the window of the building, is placed about at least a partial circumference of at least one of the first interior section or the second exterior section, where the one or more fitting mechanisms increases in length along a radial direction, and by rotating about the at least one of the first interior section or the second exterior section operates to change an effective circumference of the at least one of the first interior section or the second exterior section to reduce a gap between the at least one of the first interior section or the second exterior section and a building surface.

* * * * *